United States Patent
Wang et al.

(10) Patent No.: US 10,450,451 B2
(45) Date of Patent: Oct. 22, 2019

(54) POLYPROPYLENE COMPOSITION FOR AUTOMOTIVE INTERIOR APPLICATIONS

(71) Applicant: BOREALIS AG, Vienna (AT)

(72) Inventors: Jingbo Wang, Linz (AT); Luigi Resconi, Neuhofen an der Krems (AT); Petar Doshev, Linz (AT); Markus Gahleitner, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 182 days.

(21) Appl. No.: 15/310,283

(22) PCT Filed: May 18, 2015

(86) PCT No.: PCT/EP2015/060896
§ 371 (c)(1),
(2) Date: Nov. 10, 2016

(87) PCT Pub. No.: WO2015/177094
PCT Pub. Date: Nov. 26, 2015

(65) Prior Publication Data
US 2017/0137617 A1    May 18, 2017

(30) Foreign Application Priority Data
May 20, 2014  (EP) ...................................... 14169074

(51) Int. Cl.
| | | |
|---|---|---|
| *C08L 23/12* | (2006.01) | |
| *C08L 23/06* | (2006.01) | |
| *C08L 23/16* | (2006.01) | |
| *C08L 23/14* | (2006.01) | |
| *C08K 3/34* | (2006.01) | |
| *C08L 23/08* | (2006.01) | |
| *C08F 210/06* | (2006.01) | |
| *C08F 4/659* | (2006.01) | |
| *C08F 4/6592* | (2006.01) | |

(52) U.S. Cl.
CPC ............ *C08L 23/14* (2013.01); *C08F 210/06* (2013.01); *C08K 3/34* (2013.01); *C08L 23/06* (2013.01); *C08L 23/0815* (2013.01); *C08L 23/12* (2013.01); *C08L 23/16* (2013.01); *C08F 4/65912* (2013.01); *C08F 4/65927* (2013.01); *C08F 2410/01* (2013.01); *C08L 2205/025* (2013.01); *C08L 2205/03* (2013.01); *C08L 2207/02* (2013.01); *C08L 2207/04* (2013.01); *C08L 2207/062* (2013.01)

(58) Field of Classification Search
CPC .......... C08L 23/06; C08L 23/12; C08L 23/16; C08L 2207/02
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |

(Continued)

FOREIGN PATENT DOCUMENTS

| | | |
|---|---|---|
| CN | 101563226 A | 11/1997 |
| CN | 1248198 A | 3/2000 |

(Continued)

OTHER PUBLICATIONS

"Glossary of Basic Terms in Polymer Science (IUPAC Recommendations 1996)," *Pure Appl. Chem.*, 68(8):1591-1595 (1996).
"MDO Film—Oriented PE and PP packaging film," IN0128/GB FF 2004 10, Borealis A/S (2004).
Abiru et al., "Microstructural Characterization of Propylene-Butene-1 Copolymer Using Temperature Rising elution Fractionation," *J. Appl. Polymer Sci* 68:1493-1501 (1998).
Atwood, "Chapter 6: Anionic and Cationic Organoaluminum Compounds," *Coord. Chem. Alum.*, VCH, New York, NY, pp. 197-232 (1993).

(Continued)

*Primary Examiner* — Karuna P Reddy
(74) *Attorney, Agent, or Firm* — Leydig, Voit & Mayer, Ltd.

(57) ABSTRACT

Polypropylene composition comprising a heterophasic propylene copolymer and a mineral filler, wherein said heterophasic propylene copolymer has a melting temperature in the range of 140 to 155° C., a xylene cold soluble content in the range of 20 to 35 wt.-% and a comonomer content of the xylene cold soluble fraction in the range of 18 to 95 wt.-%, wherein further the weight ratio between heterophasic propylene copolymer and the mineral filler is in the range of 2/1 to 4/1.

12 Claims, No Drawings

(56) References Cited

U.S. PATENT DOCUMENTS

| | | |
|---|---|---|
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,691,043 A | 11/1997 | Keller et al. |
| 5,693,838 A | 12/1997 | Sangokoya et al. |
| 5,723,560 A | 3/1998 | Canich |
| 5,731,253 A | 3/1998 | Sangokoya |
| 5,731,451 A | 3/1998 | Smith et al. |
| 5,744,656 A | 4/1998 | Askham |
| 6,316,562 B1 | 11/2001 | Munck et al. |
| 6,322,883 B1 | 11/2001 | Williams |
| 6,365,682 B1 | 4/2002 | Alastalo et al. |
| 6,586,528 B1 | 7/2003 | Delaite et al. |
| 6,642,317 B1 | 11/2003 | Delaite et al. |
| 7,319,125 B2 | 1/2008 | Arjunan et al. |
| 7,342,078 B2 | 3/2008 | Schottek et al. |
| 7,354,979 B2 | 4/2008 | Brant et al. |
| 7,378,472 B2 | 5/2008 | Fell et al. |
| 7,429,634 B2 | 9/2008 | Brant et al. |
| 7,569,651 B2 | 8/2009 | Schottek et al. |
| 8,709,561 B2 | 4/2014 | Bernreitner et al. |
| 8,721,946 B2 | 5/2014 | Lederer et al. |
| 8,779,062 B2 | 7/2014 | Paavilainen et al. |
| 8,889,792 B2 | 11/2014 | Paavilainen et al. |
| 9,181,423 B2 * | 11/2015 | Kock ............... C08L 23/14 |
| 9,243,137 B2 | 1/2016 | Reichelt et al. |
| 9,487,648 B2 | 11/2016 | Gahleitner et al. |
| 2003/0149199 A1 | 8/2003 | Schottek et al. |
| 2004/0033349 A1 | 2/2004 | Henderson |
| 2004/0122191 A1 | 6/2004 | Arjunan et al. |
| 2004/0127654 A1 | 7/2004 | Brant et al. |
| 2005/0136274 A1 | 6/2005 | Hamulski et al. |
| 2005/0187367 A1 | 8/2005 | Hori et al. |
| 2005/0200046 A1 | 9/2005 | Breese |
| 2006/0020096 A1 | 1/2006 | Schottek et al. |
| 2006/0034777 A1 | 2/2006 | Mahling et al. |
| 2006/0155080 A1 | 7/2006 | Fell et al. |
| 2006/0182987 A1 | 8/2006 | Yu et al. |
| 2006/0211801 A1 | 9/2006 | Miller et al. |
| 2006/0211832 A1 | 9/2006 | Brant et al. |
| 2007/0235896 A1 | 10/2007 | McLeod et al. |
| 2008/0214767 A1 | 9/2008 | Mehta et al. |
| 2010/0029883 A1 | 2/2010 | Krajete et al. |
| 2010/0081760 A1 | 4/2010 | Rhee et al. |
| 2010/0099824 A1 | 4/2010 | Helland et al. |
| 2010/0286310 A1 | 11/2010 | Lederer et al. |
| 2010/0304062 A1 | 12/2010 | Daviknes et al. |
| 2011/0031645 A1 | 2/2011 | Kuettel et al. |
| 2012/0189830 A1 | 7/2012 | Niepelt et al. |
| 2012/0220727 A1 | 8/2012 | Klimke et al. |
| 2013/0030121 A1 | 1/2013 | Alamo et al. |
| 2013/0045862 A1 | 2/2013 | Valonen et al. |
| 2013/0167486 A1 | 7/2013 | Aarnio et al. |
| 2013/0178573 A1 | 7/2013 | Paavilainen et al. |
| 2013/0203908 A1 | 8/2013 | Kock et al. |
| 2013/0203931 A1 | 8/2013 | Paavilainen et al. |
| 2013/0236668 A1 | 9/2013 | Bernreitner et al. |
| 2014/0005324 A1 | 1/2014 | Reichelt et al. |
| 2014/0213719 A1 * | 7/2014 | Gahleitner ............... C08L 23/10 524/528 |
| 2014/0303308 A1 * | 10/2014 | Grestenberger ........ C08L 23/10 524/528 |
| 2014/0306484 A1 * | 10/2014 | Tranninger et al. |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |

FOREIGN PATENT DOCUMENTS

| | | | |
|---|---|---|---|
| CN | 1267310 A | 9/2000 | |
| CN | 1684988 A | 10/2005 | |
| CN | 1701081 A | 11/2005 | |
| CN | 1823106 A | 8/2006 | |
| CN | 101573231 | 11/2009 | |
| CN | 101772376 A | 7/2010 | |
| CN | 101903103 A | 12/2010 | |
| CN | 101970568 A | 2/2011 | |
| CN | 102365325 A | 2/2012 | |
| CN | 102869719 A | 1/2013 | |
| CN | 103068574 A | 4/2013 | |
| CN | 103080212 A | 5/2013 | |
| CN | 103347951 A | 10/2013 | |
| CN | 103649206 A | 3/2014 | |
| CN | 103649207 A | 3/2014 | |
| EP | 0 045 977 B1 | 1/1987 | |
| EP | 0 260 130 A1 | 3/1988 | |
| EP | 0 279 586 A2 | 8/1988 | |
| EP | 0 045 975 B1 | 4/1989 | |
| EP | 0 045 976 B1 | 11/1989 | |
| EP | 0 361 493 A1 | 4/1990 | |
| EP | 0 423 101 A2 | 4/1991 | |
| EP | 0 488 595 A1 | 6/1992 | |
| EP | 0 491 566 A1 | 6/1992 | |
| EP | 0 537 130 A1 | 4/1993 | |
| EP | 0 561 476 A1 | 9/1993 | |
| EP | 0 045 976 B2 | 12/1993 | |
| EP | 0 594 218 A1 | 4/1994 | |
| EP | 0 279 586 B1 | 5/1994 | |
| EP | 0 622 380 A1 | 11/1994 | |
| EP | 0 045 977 B2 | 3/1995 | |
| EP | 0 645 417 A1 | 3/1995 | |
| EP | 0 728 769 A1 | 8/1996 | |
| EP | 0 586 390 B1 | 5/1997 | |
| EP | 0 591 224 B1 | 2/1998 | |
| EP | 0 887 379 A1 | 12/1998 | |
| EP | 0 887 380 A1 | 12/1998 | |
| EP | 0 887 381 A1 | 12/1998 | |
| EP | 1 028 984 B1 | 7/2001 | |
| EP | 1 359 171 A1 | 11/2003 | |
| EP | 1 376 516 A1 | 1/2004 | |
| EP | 1 452 630 A1 | 9/2004 | |
| EP | 1452630 A1 * | 9/2004 | ............... D01F 6/46 |
| EP | 1 183 307 B1 | 7/2005 | |
| EP | 0 991 684 B1 | 1/2006 | |
| EP | 1 632 529 A1 | 3/2006 | |
| EP | 1 448 622 B1 | 4/2006 | |
| EP | 1 726 602 A1 | 11/2006 | |
| EP | 1 741 725 A1 | 1/2007 | |
| EP | 1 788 023 A1 | 5/2007 | |
| EP | 1 883 080 A1 | 1/2008 | |
| EP | 1 892 264 A1 | 2/2008 | |
| EP | 1 923 200 A1 | 5/2008 | |
| EP | 1 941 997 A1 | 7/2008 | |
| EP | 1 941 998 A1 | 7/2008 | |
| EP | 1 947 143 A1 | 7/2008 | |
| EP | 1 990 353 A1 | 11/2008 | |
| EP | 2 014 714 A1 | 1/2009 | |
| EP | 2 062 936 A1 | 5/2009 | |
| EP | 2 065 087 A1 | 6/2009 | |
| EP | 2 075 284 A1 | 7/2009 | |
| EP | 2 174 980 A1 | 4/2010 | |
| EP | 2 251 361 A1 | 11/2010 | |
| EP | 2 386 582 A1 | 11/2011 | |
| EP | 2 386 583 A1 | 11/2011 | |

(56) References Cited

FOREIGN PATENT DOCUMENTS

| | | |
|---|---|---|
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 2423257 A1 * | 2/2012 |
| EP | 1 358 252 B1 | 4/2012 |
| EP | 2 308 923 B1 | 5/2012 |
| EP | 2 487 203 A1 | 8/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A2 | 7/2013 |
| EP | 2 610 273 A1 | 7/2013 |
| EP | 2 666 818 A1 | 11/2013 |
| JP | 2013-525531 A | 6/2013 |
| JP | 2013-525532 A | 6/2013 |
| WO | WO 1987/007620 A1 | 12/1987 |
| WO | WO 1992/012182 A1 | 7/1992 |
| WO | WO 1992/013029 A1 | 8/1992 |
| WO | WO 1992/019653 A1 | 11/1992 |
| WO | WO 1992/019658 A1 | 11/1992 |
| WO | WO 1992/019659 A1 | 11/1992 |
| WO | WO 1992/021705 A1 | 12/1992 |
| WO | WO 1993/011165 A1 | 6/1993 |
| WO | WO 1993/011166 A1 | 6/1993 |
| WO | WO 1993/019100 A1 | 9/1993 |
| WO | WO 1994/010180 A1 | 5/1994 |
| WO | WO 1994/014856 A1 | 7/1994 |
| WO | WO 1995/012622 A1 | 5/1995 |
| WO | WO 1995/032994 A1 | 12/1995 |
| WO | WO 1997/010248 A1 | 3/1997 |
| WO | WO 1997/014700 A1 | 4/1997 |
| WO | WO 1997/028170 A1 | 8/1997 |
| WO | WO 1997/036939 A1 | 10/1997 |
| WO | WO 1998/012234 A1 | 3/1998 |
| WO | WO 1998/016359 A1 | 4/1998 |
| WO | WO 1998/038041 A1 | 9/1998 |
| WO | WO 1998/040331 A1 | 9/1998 |
| WO | WO 1998/046616 A1 | 10/1998 |
| WO | WO 1998/047929 A1 | 10/1998 |
| WO | WO 1998/049208 A1 | 11/1998 |
| WO | WO 1998/056831 A1 | 12/1998 |
| WO | WO 1998/058971 A1 | 12/1998 |
| WO | WO 1998/058976 A1 | 12/1998 |
| WO | WO 1998/058977 A1 | 12/1998 |
| WO | WO 1999/010353 A1 | 3/1999 |
| WO | WO 1999/012981 A1 | 3/1999 |
| WO | WO 1999/019335 A1 | 4/1999 |
| WO | WO 1999/024478 A1 | 5/1999 |
| WO | WO 1999/024479 A1 | 5/1999 |
| WO | WO 1999/033842 A1 | 7/1999 |
| WO | WO 1999/041290 A1 | 8/1999 |
| WO | WO 2000/034341 A2 | 6/2000 |
| WO | WO 2000/068315 A1 | 11/2000 |
| WO | WO 2001/048034 A2 | 7/2001 |
| WO | WO 2001/058970 A1 | 8/2001 |
| WO | WO 2001/070395 A2 | 9/2001 |
| WO | WO 2002/002576 A1 | 1/2002 |
| WO | WO 2002/051912 A1 | 7/2002 |
| WO | WO 2002/057342 A2 | 7/2002 |
| WO | WO 2003/000754 A1 | 1/2003 |
| WO | WO 2003/000755 A2 | 1/2003 |
| WO | WO 2003/000756 A1 | 1/2003 |
| WO | WO 2003/000757 A1 | 1/2003 |
| WO | WO 2003/051934 A2 | 6/2003 |
| WO | WO 2003/054035 A1 | 7/2003 |
| WO | WO 2003/066698 A1 | 8/2003 |
| WO | WO 2003/082879 A1 | 10/2003 |
| WO | WO 2004/000899 A1 | 12/2003 |
| WO | WO 2004/013193 A2 | 2/2004 |
| WO | WO 2004/029112 A2 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2009/092691 A1 | 7/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/052263 A1 | 5/2010 |
| WO | WO 2010/053644 A1 | 5/2010 |
| WO | WO 2010/082943 A1 | 7/2010 |
| WO | WO 2010/115878 A1 | 10/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/117032 A1 | 9/2011 |
| WO | WO 2011/117102 A1 | 9/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/025584 A1 * | 3/2012 | ............... C08L 23/14 |
| WO | WO 2012/093098 A1 | 7/2012 |
| WO | WO-2012119921 A1 * | 9/2012 |
| WO | WO 2013/004507 A1 | 1/2013 |
| WO | WO 2013/007650 A1 | 1/2013 |
| WO | WO 2013/010877 A1 | 1/2013 |
| WO | WO 2013/010879 A1 | 1/2013 |
| WO | WO-2013010879 A1 * | 1/2013 |
| WO | WO-2013026745 A1 * | 2/2013 | ............... C08L 23/10 |
| WO | WO 2013/050119 A1 | 4/2013 |
| WO | WO 2013/079457 A1 | 6/2013 |
| WO | WO 2013/092615 A1 | 6/2013 |
| WO | WO 2013/092620 A1 | 6/2013 |
| WO | WO 2013/092624 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |

(56) References Cited

FOREIGN PATENT DOCUMENTS

| WO | WO 2015/117958 A1 | 8/2015 |
|---|---|---|
| WO | WO 2015/121160 A1 | 8/2015 |
| WO | WO 2015/177094 A1 | 11/2015 |

OTHER PUBLICATIONS

Britovsek et al., "The Search for New-Generation Olefin Polymerization Catalysts: Life beyond Metallocenes," *Angew. Chem, Int. Ed.*, vol. 38(4), pp. 428-447 (1999).
Busico et al., "Alk-1-ene Polymerization in the Presence of a Monocyclopentadienyl Zirconium(IV) Acetamidinate Catalyst: Microstructural and Mechanistic Insights*a*," *Macromol. Rapid Commun.* 28:1128-1134 (2007).
Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Castignolles et al., "Detection and quantification of branching in polyacrylates by size-exclusion chromatography (SEC) and melt-state $^{13}$C NMR spectroscopy," *Polymer*, 50(11):2373-2383, (2009).
Cheng, "$^{13}$C NMR Analysis of Ethylene-Propylene Rubbers," *Macromolecules* 17:1950-1955 (1984).
Cimmino et al., "Thermal and mechanical properties of isotactic random propylene-butene-1 copolymers," *Polymer* 19:1222-1223 (1978).
Crispino et al., "Influence of Composition on the Melt Crystallization of Isotactic Random Propylene/1-Butene Copolymers," *Makromol. Chem.* 181:1747-1755 (1980).
Filip et al., "Heteronuclear decoupling under fast MAS by a rotor-synchronized Hahn-echo pulse train,"*J. Magnet. Reson.* 176:239-243 (2005).
Fujiyama et al., "Effect of Molecular Parameters on the Shrinkage of Injection-Molded Polypropylene," *J. Appl. Polym. Sci.* 22:1225-1241 (1978).
Gahleitner et al., "Nucleation of Polypropylene Homo- and Copolymers," *International Polymer Processing* 26(1):2-20 (2011).
Galli et al., "Technology: driving force behind innovation and growth of polyolefins," *Prog. Polym. Sci.* 26:1287-1336 (2001).
Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).
Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198-S208 (2007).
Holbrey et al., "Liquid clathrate formation in ionic liquid-aromatic mixtures," *Chem. Comm.*, 2003, pp. 476-477.
Kakugo et al., "$^{13}$C NMR Determination of Monomer Sequence Distribution in Ethylene-Propylene Copolymers Prepared with δ-TiCl$_3$-Al(C$_2$H$_5$)$_2$Cl," *Macromolecules* 15:1150-1152 (1982).
Klimke et al., "Optimisation and Application of Polyolefin Branch Quantification by Melt-State $^{13}$C NMR Spectroscopy," *Macromol. Chem. Phys.* 207(4):382-395 (2006).
Koch et al., "Evaluation of scratch resistance in multiphase PP blends," *Polymer Testing* 26: 927-936 (2007).
McAuley et al., "On-line Inference of Polymer Properties in an Industrial Polyethylene Reactor," *AIChE Journal*, vol. 37, No, 6, pp. 825-835 (1991).
Myhre et al., "Oriented PE films—Expanding Opportunities with Borstar® PE," Maack Speciality Films, pp. 1-10 (2001).
Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).
Periodic Table (IUPAC Jun. 22, 2007).
*Plastics Additives Handbook*, 5th edition, Hans Zweifel, Editor, Hanser Publishers, Munich, pp. 871-873 (2001).

*Plastics Additives Handbook*, 5th edition, Hans Zweifel, Editor, Hanser Publishers, Munich, pp. 956-965 (2001).
Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).
*Propylene Handbook*, 2$^{nd}$ Edition, Chapter 7.2.2 "Oriented Films," pp. 405-415, Nello Pasquini, Editor, Hanser (2005).
Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).
Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).
Resconi et al., "Highly Regiospecific Zirconocene Catalysts for the Isospecific Polymerization of Propene," *JACS* 120(10):2308-2321 (1998).
Resconi et al., "Selectivity in Propene Polymerization with Metallocene Catalysts," *Chem. Rev.* 100(4):1253-1345 (2000).
Singh et al., "Triad sequence determination of ethylene-propylene copolymers—application of quantitative $^{13}$C NMR," *Polymer Testing* 28(5):475-479 (2009).
Spaleck et al., "The Influence of Aromatic Substituents on the Polymerization Behavior of Bridged Zirconocene Catalysts," *Organometallics* 13:954-963 (1994).
Spear et al., "Liquid Clathrates," *Encyclopedia of Supramolecular Chemistry*, J.L. Atwood and J.W. Steed (Eds.); Marcel Dekker: New York, pp. 804-808 (2004).
Wang et al., "Structural Analysis of Ethylene/Propylene Copolymers Synthesized with a Constrained Geometry Catalyst," *Macromolecules* 33:1157-1162 (2000).
Zhou et al., "A new decoupling method for accurate quantification of polyethylene copolymer composition and triad sequence distribution with $^{13}$C NMR," *J. Magnet. Reson.* 187:225-233 (2007).
"Polyethylene Lumicene® mPE M5510 EP," Total Refining & Chemicals, Total Ecosolutions, Belgium, Aug. 2013 (2 pgs.).
European Patent Office, International Search Report in International Application No. PCT/EP2015/060896 (dated Jul. 16, 2015).
European Patent Office, Written Opinion in International Application No. PCT/EP2015/060896 (dated Jul. 16, 2015).
State Intellectual Property Office of the People's Republic of China, First Notification of Office Action in Chinese Patent Application No. 201580026603.1 (dated Aug. 3, 2018).
U.S. Appl. No. 14/911,295, filed Feb. 10, 2016.
U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.
U.S. Appl. No. 15/113,907, filed Jul. 25, 2016.
U.S. Appl. No. 15/113,922, filed Jul. 25, 2016.
U.S. Appl. No. 15/115,929, filed Aug. 2, 2016.
U.S. Appl. No. 15/514,641, filed Mar. 27, 2017.
U.S. Appl. No. 15/531,974, filed May 31, 2017.
U.S. Appl. No. 15/526,957, filed May 15, 2017.
U.S. Appl. No. 15/566,588, filed Oct. 13, 2017.
U.S. Appl. No. 15/741,861, filed Jan. 4, 2018.

(56) References Cited

OTHER PUBLICATIONS

National Intellectual Property Administration, People's Republic of China, Second Notification of Office Action in Chinese Patent Application No. 201580026603.1 (dated Apr. 1, 2019).

* cited by examiner

US 10,450,451 B2

POLYPROPYLENE COMPOSITION FOR AUTOMOTIVE INTERIOR APPLICATIONS

CROSS-REFERENCE TO RELATED APPLICATIONS

This patent application is the U.S. national phase of International Application No. PCT/EP2015/060896, filed on May 18, 2015, which claims the benefit of European Patent Application No. 14169074.3, filed May 20, 2014, the disclosures of which are incorporated herein by reference in their entireties for all purposes.

The present invention is directed to a new polypropylene composition based on heterophasic propylene copolymer as well as to articles made there from.

Automotive interior parts like dashboards, door claddings, trims etc. are commonly made from polymers. Especially propylene based resins are widely used for these applications. For such parts it is often tried to maintain the high-quality perception till the end of the car's lifetime. Thus the polymer should provide a high resistance to scratches e.g. from keys, fingernails, rings etc.

In comparison to metals polymers have rather low stiffness and surface hardness and thus are much more prone to scratches. Therefore quite often additives, like fillers, are used to over-come this drawback apart. However additives have the drawback to enhance the emission values of the automotive interior parts, which is undesired.

Combining the requirement of high scratch resistance and low emission with good mechanics is challenging, especially in view of the often high expectations regarding processability respectively flowability.

It is therefore an object of the present invention to provide a polypropylene composition with high scratch resistance and good mechanical properties, like high flexural modulus and high impact.

The finding of the present invention is that a heterophasic polypropylene must be combined with mineral filler. Preferably the heterophasic propylene copolymer is comonomer rich, e.g. ethylene rich.

Thus the present invention is directed in a first aspect to a polypropylene composition comprising
(a) a heterophasic propylene copolymer (HECO) comprising
   (a1) a matrix (M) being a propylene homopolymer (H-PP) or propylene copolymer (R-PP) and
   (a2) an elastomeric propylene copolymer (EC) dispersed in said matrix (M), and
(b) a mineral filler (F),
wherein said heterophasic propylene copolymer (HECO) has
(i) a melting temperature determined by differential scanning calorimetry (DSC) in the range of 140 to 155° C.,
(ii) a xylene cold soluble (XCS) content in the range of 20 to 35 wt.-%,
(iii) a comonomer content of the xylene cold soluble (XCS) fraction in the range of 18 to 95 wt.-%,
wherein further the weight ratio between heterophasic propylene copolymer (HECO) and the mineral filler (F) [(HECO)/(F)] is in the range of 2/1 to below 4/1.

Preferably the heterophasic propylene copolymer (HECO) according to the first aspect has 2,1 regio-defects of at least 0.2% determined by $^{13}$C-NMR spectroscopy. Still more preferably the matrix (M) of the heterophasic propylene copolymer (HECO) has melt flow rate MFR$_2$ (230° C.) measured according to ISO 1133 in the range of 20 to 80 g/10 min.

In a second aspect of the present invention the polypropylene composition comprises
(a) a heterophasic propylene copolymer (HECO) comprising
   (a1) a matrix (M) being a propylene homopolymer (H-PP) or propylene copolymer (R-PP) and
   (a2) an elastomeric propylene copolymer (EC) dispersed in said matrix (M), and
(b) a mineral filler (F),
wherein said heterophasic propylene copolymer (HECO) has
(i) 2,1 regio-defects of at least 0.2% determined by $^{13}$C-NMR spectroscopy,
(ii) a xylene cold soluble (XCS) content in the range of 20 to 35 wt.-%,
(iii) a comonomer content of the xylene cold soluble (XCS) fraction in the range of 18 to 95 wt.-%,
wherein further the weight ratio between heterophasic propylene copolymer (HECO) and the mineral filler (F) [(HECO)/(F)] is in the range of 2/1 to below 4/1.

Preferably the matrix (M) of the heterophasic propylene copolymer (HECO) of the polypropylene composition according to the second aspect has melt flow rate MFR$_2$ (230° C.) measured according to ISO 1133 in the range of 20 to 80 g/10 min.

In one preferred embodiment of the present invention the polypropylene composition according to the first and second aspect comprises additionally a high density polyethylene (HDPE), preferably the amount of the high density polyethylene (HDPE), based on the total weight of the polypropylene composition, is at least 5.0 wt.-%.

Additionally or alternatively to the previous paragraph, the polypropylene composition comprises additionally a plastomer (P) being chemically different to the elastomeric propylene copolymer (EC) of the heterophasic propylene copolymer (HECO), preferably the amount of the plastomer (P), based on the total weight of the polypropylene composition, is at least 5.0 wt.-%.

Preferably the xylene cold soluble (XCS) fraction of the heterophasic propylene copolymer (HECO) as described herein has a comonomer content in the range of 60 to 95 wt.-%.

In one preferred embodiment the matrix (M) of the heterophasic propylene copolymer (HECO) is a propylene homopolymer (H-PP).

Preferably the intrinsic viscosity of the xylene cold soluble fraction (XCS) of the heterophasic propylene copolymer (HECO) is at least 1.0, preferably in the range of 1.0 to 4.2 dl/g.

It is especially preferred that the comonomer content of the heterophasic propylene copolymer (HECO), based on the total weight of the heterophasic propylene copolymer (HECO) is in the range of 5.5 to 35 wt.-%, preferably in the range of 15 to 35 wt.-%.

In still another preferred embodiment the melt flow rate MFR$_2$ (230° C.) measured according to ISO 1133 of the polypropylene composition is in the range of 1.0 to 25 g/10 min, preferably in the range of 1.0 to 20 g/10 min, and/or of the heterophasic propylene copolymer (HECO) is in the range of 1.0 to 30 g/10 min, preferably in the range of 1.0 to 25 g/10 min.

Preferably the heterophasic propylene copolymer (HECO) has a first glass transition temperature Tg(1) and a second glass transition temperature Tg(2), wherein said first glass transition temperature Tg(1) is above the second glass transition temperature Tg(2), more preferably (a) the difference between the first glass transition temperature Tg(1) and second glass transition temperature Tg(2) is at least 30° C.,
and/or
(b) the second glass transition temperature Tg(2) is in the range of −60 to −30° C.

Preferably the high density polyethylene (HDPE) has a density of at least 940 kg/m$^3$ and/or a melt flow rate MFR$_2$ (190° C.) of 0.2 to 15 g/10 min.

Preferably the plastomer (P) is a polyethylene, more preferably said polyethylene comprises units derived from ethylene and C$_3$ to C$_8$ α-olefins, and/or has a density of equal or less than 920 kg/m$^3$, and/or has a melt flow rate MFR$_2$ (190° C.) measured according to ISO 1133 in the range of 0.5 to 30.0 g/10 min.

The invention is further directed to an article, preferably the article is an automotive interior article, comprising a polypropylene composition according to the present invention.

In the following the invention is described in more detail.

Composition

Essential components of the polypropylene composition are the heterophasic propylene copolymer (HECO) and the mineral filler (F). In preferred embodiments the polypropylene composition comprises additionally a high density polyethylene (HDPE) and/or a plastomer (P).

Preferably the weight ratio between heterophasic propylene copolymer (HECO) and the mineral filler (F) [(HECO)/(F)] is in the range of 2/1 to below 4/1, more preferably in the range of 2/1 to 7/2, yet more preferably in the range of 5/2 to 7/2.

Preferably the polypropylene composition comprises as polymer components only the heterophasic propylene copolymer (HECO), the high density polyethylene (HDPE) and the plastomer (P). In other words the polypropylene composition comprises not more than 8 wt.-%, more preferably not more than 5 wt.-%, yet more preferably not more than 2.5 wt.-%, based on the total weight of the polypropylene composition, of polymers other than the heterophasic propylene copolymer (HECO), the high density polyethylene (HDPE) and the plastomer (P).

In a preferred embodiment the polypropylene composition comprises
(a) 40 to below 80 wt.-%, more preferably 50 to 70 wt.-%, yet more preferably 55 to 65 wt.-%, based on the total weight of the composition, of the heterophasic propylene copolymer (HECO);
(b) 5 to 30 wt.-%, more preferably 10 to 25 wt.-%, yet more preferably 15 to 25 wt.-%, based on the total weight of the composition, of the mineral filler (F);
(c) 0 to 20 wt.-%, more preferably 5 to 15 wt.-%, yet more preferably 8 to 12 wt.-%, based on the total weight of the composition, of the high density polyethylene (HDPE); and
(d) 0 to 20 wt.-%, more preferably 5 to 15 wt.-%, yet more preferably 8 to 12 wt.-%, based on the total weight of the composition, of the plastomer (P).

Preferably the polypropylene composition according to this invention has a melt flow rate MFR$_2$ (230° C.) in the range of 1.0 to 25 g/10 min, preferably in the range of 1.0 to 20 g/10 min, still more preferably in the range of 1.5 to 18 g/10 min.

In a preferred embodiment the polypropylene composition according to this invention has
(a) a flexural modulus of at least 1,000 MPa, more preferably in the range of 1,000 to 1,600 MPa, yet more preferably in the range of 1,100 to 1,500 MPa,
and/or
(b) a Charpy notched impact strength at +23° C. of ≥35 kJ/m$^2$, preferably in the range of 35 to 85 kJ/m$^2$, yet more preferably in the range of 40 to 80 kJ/m$^2$,
and/or
(c) a Charpy notched impact strength at −20° C. of ≥4 kJ/m$^2$, preferably in the range of 4 to 12 kJ/m$^2$, yet more preferably in the range of 4.5 to 10.0 kJ/m$^2$.

The polypropylene composition as defined in the instant invention may contain up to 5.0 wt.-%, based on the total weight of the composition, additives, like nucleating agents and antioxidants, as well as slip agents and antiblocking agents. Preferably the additive content is below 2.5 wt.-%, like below 1.0 wt.-%, based on the total weight of the composition.

The polypropylene composition of the present invention can be prepared by any suitable method known in the art, such as by blending the heterophasic propylene copolymer (HECO) with the other components either directly, e.g., in an extruder, such that the same extruder is used to make the finished product, or by pre-melt mixing in a separate mixer or extruder. For mixing, a conventional compounding or blending apparatus, e.g. a Banbury mixer, a 2-roll rubber mill, Buss-co-kneader or a twin screw extruder may be used.

In the following the individual components are described in more detail.

Heterophasic Propylene Copolymer (HECO)

The present invention is directed to a heterophasic propylene copolymer (HECO). More precisely the present invention is directed to a heterophasic propylene copolymer (HECO) comprising a matrix (M) being a propylene homopolymer (H-PP) or a propylene copolymer (R-PP) and dispersed therein an elastomeric propylene copolymer (EC). Thus the matrix (M) contains (finely) dispersed inclusions being not part of the matrix (M) and said inclusions contain the elastomeric propylene copolymer (EC). The term "inclusion" according to this invention shall preferably indicate that the matrix and the inclusion form different phases within the heterophasic propylene copolymer (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic propylene copolymer (HECO) according to this invention comprises as polymer components only the polymer matrix (M), i.e. the propylene homopolymer (H-PP) or the propylene copolymer (R-PP), and the elastomeric propylene copolymer (EC). In other words, the heterophasic propylene copolymer (HECO) may contain further additives but no other polymer in an amount exceeding 5.0 wt.-%, more preferably exceeding 3.0 wt.-%, like exceeding 1.0 wt.-%, based on the total heterophasic propylene copolymer (HECO). One additional polymer which may be present in such low amounts is a polyethylene which is a by-reaction product obtained by the preparation of the heterophasic propylene copolymer (HECO). Accordingly, it is in particular appreciated that the instant heterophasic propylene copolymer (HECO) contains only the polymer matrix (M), i.e. the propylene homopolymer (H-PP) or the propylene copolymer (R-PP), the elastomeric propylene copolymer (EC) and optionally polyethylene in amounts as mentioned in this paragraph.

The heterophasic propylene copolymer (HECO) according to this invention is featured by a moderate melt flow rate. Accordingly, the heterophasic propylene copolymer (HECO) has a melt flow rate MFR$_2$ (230° C.) in the range of 1.0 to 30.0 g/10 min, preferably in the range of 1.0 to 25.0 g/10 min, more preferably in the range of 2.0 to 21.0 g/10 min.

Preferably, it is desired that the heterophasic propylene copolymer (HECO) is thermo mechanically stable. Accordingly, it is preferred that the heterophasic propylene copolymer (HECO) has a melting temperature of at least 140° C., more preferably in the range of 140 to 155° C., still more preferably in the range of 145 to 152° C.

Preferably the heterophasic propylene copolymer (HECO) has a crystallization temperature Tc (if not α-nucleated) of at most 120° C., more preferably in the range of 105 to 120° C., like in the range of 108 to 118° C.

The heterophasic propylene copolymer (HECO) comprises apart from propylene also comonomers. Preferably the heterophasic propylene copolymer (HECO) comprises apart from propylene ethylene and/or C$_4$ to C$_8$ α-olefins. Accordingly the term "propylene copolymer" according to this invention is understood as a polypropylene comprising, preferably consisting of, units derivable from
(a) propylene
and
(b) ethylene and/or C$_4$ to C$_8$ α-olefins.

Thus, the heterophasic propylene copolymer (HECO) as well as its individual polymer components, i.e. the propylene copolymer (R-PP) (if present), as well as the elastomeric propylene copolymer (EC), comprises monomers copolymerizable with propylene, for example comonomers such as ethylene and/or C$_4$ to C$_8$ α-olefins, in particular ethylene and/or C$_4$ to C$_8$ α-olefins, e.g. 1-butene and/or 1-hexene. Preferably, the heterophasic propylene copolymer (HECO) according to this invention comprises, especially consists of, monomers copolymerizable with propylene from the group consisting of ethylene, 1-butene and 1-hexene. More specifically, the heterophasic propylene copolymer (HECO) of this invention comprises—apart from propylene—units derivable from ethylene and/or 1-butene. In a preferred embodiment, the heterophasic propylene copolymer (HECO) according to this invention comprises units derivable from ethylene and propylene only. Still more preferably the propylene copolymer (R-PP) (if present) as well as the elastomeric propylene copolymer (EC) of the heterophasic propylene copolymer (HECO) contains the same comonomers, like ethylene.

Accordingly, the elastomeric propylene copolymer (EC) is preferably an ethylene propylene rubber (EPR) whereas the propylene copolymer (R-PP) is a propylene ethylene copolymer (R-PP), i.e. consist only units derived from propylene and ethylene. Accordingly in one specific embodiment the comonomer in the heterophasic propylene copolymer (HECO) is ethylene only. In an especially preferred case the matrix (M) of the heterophasic propylene copolymer (HECO) is a propylene homopolymer (H-PP) whereas the elastomeric propylene copolymer (EC) is an ethylene propylene rubber (EPR).

Additionally, it is preferred that the heterophasic propylene copolymer (HECO) has a comonomer content, like ethylene content, based on the total weight of the heterophasic propylene copolymer (HECO), in the range from 5.5 to 35 wt-%, like 5.9 to 35 wt-%, more preferably in the range from 15 to 35 wt-%, yet more preferably in the range from 17 to 35 wt-%.

The xylene cold soluble (XCS) fraction of the heterophasic propylene copolymer (HECO) is in the range from 20 to equal or below 35 wt-%, preferably in the range from 22 to 32 wt-%, more preferably in the range from 24 to 31 wt-%.

Further it is appreciated that the xylene cold soluble (XCS) fraction of the heterophasic propylene copolymer (HECO) is specified by its intrinsic viscosity. A low intrinsic viscosity (IV) value reflects a low weight average molecular weight. For the present invention it is preferred that the xylene cold soluble fraction (XCS) of the heterophasic propylene copolymer (HECO) has an intrinsic viscosity (IV) of at least 1.0 dl/g, more preferably in the range of 1.0 to 4.2 dl/g, still more preferably in the range of 1.1 to 4.0 dl/g, yet more preferably in the range of 1.1 to 3.7 dl/g.

Additionally it is preferred that the comonomer content, i.e. ethylene content, of the xylene cold soluble (XCS) fraction of the heterophasic propylene copolymer (HECO) is in the range of 18 to 95 wt-%, more preferably in the range of 40 to 95 wt-%, still more preferably in the range of 60 to 95 wt-%, yet more preferably in the range of 70 to 90 wt-%, like in the range of 75 to 85 wt-%.

Still further, the heterophasic propylene copolymer (HECO) according to the invention preferably fulfills in-equation (I), more preferably in-equation (Ia), still more preferably in-equation (Ib), $$\frac{C(XCS)}{C(\text{total})} > 2.1; \tag{I}$$

$$15.0 \geq \frac{C(XCS)}{C(\text{total})} > 2.4; \tag{Ia}$$

$$10.0 \geq \frac{C(XCS)}{C(\text{total})} \geq 2.8; \tag{Ib}$$

wherein
C(XCS) is the comonomer content, like ethylene content, [in wt.-%] of the xylene cold soluble (XCS) fraction of the heterophasic propylene copolymer (HECO);
C(total) is the comonomer content, like ethylene content, [in wt-%] of the total heterophasic propylene copolymer (HECO).

Additionally or alternatively to in-equation (I) it is preferred that the heterophasic propylene copolymer (HECO) according to the invention preferably fulfills in-equation (II), more preferably in-equation (IIa), still more preferably in-equation (IIb), $$\frac{C(\text{total})}{XCS} > 0.18; \tag{II}$$

$$1.0 \geq \frac{C(\text{total})}{XCS} > 0.18; \tag{IIa}$$

$$1.0 \geq \frac{C(\text{total})}{XCS} > 0.45; \tag{IIb}$$

wherein
C(XCS) is the comonomer content, like ethylene content, [in wt.-%] of the total heterophasic propylene copolymer (HECO);
XCS is the content [in wt.-%] of the xylene cold soluble (XCS) fraction of the heterophasic propylene copolymer (HECO).

As mentioned above multiphase structure of the heterophasic propylene copolymer (HECO) (elastomeric propylene copolymer (EC) dispersed in the matrix (M)) can be identified by the presence of at least two distinct glass transition temperatures. The higher first glass transition temperature (Tg(1)) represents the matrix (M) whereas the lower second glass transition temperature (Tg(2)) reflects the elastomeric propylene copolymer (EC) of the heterophasic propylene copolymer (HECO).

Accordingly, it is preferred that the second glass transition temperature Tg(2) is below −25° C., like equal or below −30° C., more preferably is in the range of −60 to −30° C., yet more preferably in the range of −58 to −32° C., still more preferably in the range of −55 to −33° C.

It is further appreciated that the heterophasic propylene copolymer (HECO) according to this invention has additionally a first glass transition temperature Tg(1) (representing the matrix (M) of the heterophasic propylene copolymer (HECO)) in the range of −8 to +5° C., more preferably in the range of −5 to +4° C., like in the range 0 to +5° C.

Accordingly the first glass transition temperature Tg(1) is preferably above the second glass transition temperature Tg(2). Still more preferably the difference between the first glass transition temperature Tg(1) and second glass transition temperature Tg(2) is at least 30° C., more preferably at least 34° C., yet more preferably in the range of 34 to 55° C., still more preferably in the range of 35 to 52° C.

Preferably the heterophasic propylene copolymer (HECO) according to this invention has been produced in the presence of a metallocene catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes. These regio-defects can be of three different types, namely 2,1-erythro (2,1e), 2,1-threo (2,1t) and 3,1 defects. A detailed description of the structure and mechanism of formation of regio-defects in polypropylene can be found in Chemical Reviews 2000, 100(4), pages 1316-1327. By introducing defects into the polymer chain, such as comonomers, stereo-errors or regio-defects, the physical properties of polypropylene can be modified. In particular, by increasing the amount of chain defects, crystallinity and melting point of polypropylene can be reduced.

The term "2,1 regio defects" as used in the present invention defines the sum of 2,1 erythro regio-defects and 2,1 threo regio-defects.

Accordingly it is preferred that the heterophasic propylene copolymer (HECO) according to this invention has 2,1 regio-defects, like 2,1 erythro regio-defects, of at least 0.1%, more preferably of at least 0.2%, still more preferably in the range of 0.2 to 4.0%, determined by $^{13}$C-NMR spectroscopy. For example, the heterophasic propylene copolymer (HECO) of the instant invention has 2,1 regio-defects, like 2,1 erythro regio-defects, of from 0.4 to 2.0%, determined by $^{13}$C-NMR spectroscopy.

The heterophasic propylene copolymer (HECO) as defined in the instant invention may contain up to 5.0 wt.-% additives, like nucleating agents and antioxidants, as well as slip agents and antiblocking agents. Preferably the additive content is below 3.0 wt.-%, like below 1.0 wt.-%.

The heterophasic propylene copolymer (HECO) can be further defined by its individual components, i.e. the polymer matrix (M) and the elastomeric propylene copolymer (EC).

The polymer matrix (M) can be a propylene copolymer (R-PP) or a propylene homopolymer (H-PP), the latter is especially preferred.

The expression "propylene homopolymer" as used throughout the instant invention relates to a polypropylene that consists substantially, i.e. of equal or above than 99.0 wt %, more preferably of equal or above than 99.5 wt %, like equal or above than 99.8 wt %, of propylene units. In a preferred embodiment only propylene units in the propylene homopolymer are detectable.

In the case that the polymer matrix is a propylene copolymer (R-PP), said propylene copolymer (R-PP) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the propylene copolymer (R-PP) according to this invention comprises, especially consists of, monomers copolymerizable with propylene from the group consisting of ethylene, 1-butene and 1-hexene. More specifically the propylene copolymer (R-PP) of this invention comprises—apart from propylene—units derivable from ethylene and/or 1-butene. In a preferred embodiment the propylene copolymer (R-PP) comprises units derivable from ethylene and propylene only.

Preferably the comonomer content of the propylene copolymer (R-PP) is in the range of more than 1.0 to 10.0 wt.-%, yet more preferably in the range of 1.5 to 8.0 wt-%, still more preferably in the range of 1.5 to 5.0 wt-%.

As mentioned above, the polymer matrix (M) is preferably a propylene homopolymer (H-PP).

The polymer matrix (M) may consist of a single polymer, like a propylene homopolymer, but may also comprise a mixture of (two) different propylene polymers, like different propylene homopolymers. Ideally, however a single polymer, like a single propylene homopolymer (H-PP), is present.

Preferably the polymer matrix (M), e.g. the propylene homopolymer (H-PP), has a melt flow rate $MFR_2$ (230° C.) in the range of 20 to 80 g/10 min, preferably in the range of 20 to 60 g/10 min, more preferably in the range of 25 to 50 g/10 min.

Preferably the weight ratio between the matrix (M), i.e. the propylene homopolymer (H-PP) or the propylene copolymer (R-PP), and the elastomeric propylene copolymer (EC) is in the range of 3/2 to 5/1, more preferably in the range of 2/1 to 9/2, still more preferably in the range of 2/1 to 4/1.

Accordingly in one preferred embodiment, the heterophasic propylene copolymer (HECO) preferably comprises 55 to 95 wt.-%, more preferably 60 to 90 wt.-%, still more preferably 65.0 to 85.0 wt.-%, of the polymer matrix (M) based on the total weight of the heterophasic propylene copolymer (HECO).

Additionally, the heterophasic propylene copolymer (RA-HECO) preferably comprises 5 to 45 wt.-%, more preferably 10 to 40 wt.-%, still more preferably 15 to 35 wt.-% of the elastomeric propylene copolymer (EC), based on the total weight of the heterophasic propylene copolymer (HECO).

Accordingly, a further component of the heterophasic propylene copolymer (HECO) is the elastomeric propylene copolymer (EC) dispersed in the matrix (M). Concerning the comonomers used in the elastomeric propylene copolymer (EC) it is referred to the information provided for the heterophasic propylene copolymer (HECO). Accordingly the elastomeric propylene copolymer (EC) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the elastomeric propylene copolymer (EC) comprises, especially consists of, monomers copolymerizable with propylene from the group consisting of ethylene, 1-butene and 1-hexene. More specifically, the elastomeric propylene copolymer (EC) comprises—apart from propylene—units derivable from ethylene and/or 1-butene. Thus, in an especially preferred embodiment the elastomeric propylene copolymer (EC) comprises units derivable from ethylene and propylene only.

As a first approximation the xylene cold soluble (XCS) fraction represents the elastomeric propylene copolymer (EC). Accordingly the comonomer content of the xylene cold soluble (XCS) fraction and of the elastomeric propylene copolymer (EC) are similar. Thus, the comonomer content, the ethylene content, of the elastomeric propylene copolymer (EC) preferably is preferably in the range of 18 to 95 wt-%, more preferably in the range of 40 to 95 wt-%, like 40 to 90 wt.-%, still more preferably in the range of 60 to 95 wt.-%, like 60 to 90 wt.-%, yet more preferably in the range of 70 to 90 wt.-%, like in the range of 75 to 85 wt.-%.

The instant heterophasic propylene copolymer (HECO) is preferably produced in a multistage process comprising at least two reactors, preferably at least three reactors, connected in series.

Accordingly the heterophasic propylene copolymer (HECO) according to this invention is produced by polymerizing:
(I) propylene and optionally an α-olefin different to propylene, preferably ethylene and/or $C_4$ to $C_8$ α-olefin, more preferably ethylene, so as to form the polymer matrix (M) being either a propylene homopolymer (H-PP) or a propylene copolymer (R-PP), preferably being a propylene homopolymer (H-PP); and subsequently polymerizing
(II) propylene and an α-olefin different to propylene, preferably ethylene, preferably in the gas phase, so as to form the elastomeric propylene copolymer (EC) dispersed in said matrix (M);
wherein preferably both steps (I) and (II) take place in the presence of the same single site solid particulate catalyst free from an external carrier, preferably a catalyst comprising (i) a complex of formula (I) as defined in detail below.

Preferably the heterophasic propylene copolymer (HECO) is obtained by a sequential polymerization process comprising the steps of
(a) polymerizing in a first reactor propylene and optionally ethylene and/or $C_4$ to $C_8$ α-olefin obtaining thereby a first polypropylene fraction, preferably polymerizing in a first reactor propylene thereby obtaining a first propylene homopolymer fraction,
(b) transferring said first polypropylene fraction, preferably said first propylene homopolymer fraction, in a second reactor,
(c) polymerizing in said second reactor in the presence of the first polypropylene fraction, preferably in the presence of the first propylene homopolymer fraction, propylene and optionally ethylene and/or $C_4$ to $C_8$ α-olefin obtaining a second polypropylene fraction, preferably a second propylene homopolymer fraction, said first polypropylene fraction, preferably said first propylene homopolymer fraction, and said second polypropylene fraction, preferably said second propylene homopolymer fraction, form the polymer matrix (M), e.g. the propylene homopolyme (H-PP),
(d) transferring said polymer matrix (M) in a third reactor,
(e) polymerizing in said third reactor in the presence of the polymer matrix (M) propylene and ethylene and/or $C_4$ to $C_8$ α-olefin obtaining an elastomeric propylene copolymer (EC), said polymer matrix (M) and said elastomeric propylene copolymer (EC) form the heterophasic propylene copolymer (HECO),
wherein preferably the steps take place in the presence of the same single site solid particulate catalyst free from an external carrier, preferably a catalyst comprising (i) a complex of formula (I) as defined in detail below.

For preferred embodiments of the heterophasic propylene copolymer (HECO), the polymer matrix, e.g. the propylene homopolymer (H-PP), and the elastomeric copolymer (EC) reference is made to the definitions given above.

The term "sequential polymerization process" indicates that the heterophasic propylene copolymer (HECO) is produced in at least two, like three, reactors connected in series. Accordingly the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor are gas phase reactors (GPR). Accordingly for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by *Borealis* A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor, i.e. the slurry reactor, like a loop reactor, may be as follows:
 the temperature is within the range of 50° C. to 110° C., preferably between 60° C. and 100° C., more preferably between 65 and 95° C.,
 the pressure is within the range of 20 bar to 80 bar, preferably between 40 bar to 70 bar,
 hydrogen can be added for controlling the molar mass in a manner known per se.

Subsequently, the reaction mixture of the first reactor is transferred to the second reactor, i.e. gas phase reactor, where the conditions are preferably as follows:
 the temperature is within the range of 50° C. to 130° C., preferably between 60° C. and 100° C.,
 the pressure is within the range of 5 bar to 50 bar, preferably between 15 bar to 35 bar,
 hydrogen can be added for controlling the molar mass in a manner known per se.

The condition in the third reactor is similar to the second reactor.

The residence time can vary in the three reactors.

In one embodiment of the process for producing the heterophasic propylene copolymer (HECO) the residence time in bulk reactor, e.g. loop is in the range 0.1 to 2.5 hours, e.g. 0.15 to 1.5 hours and the residence time in gas phase reactor will generally be 0.2 to 6.0 hours, like 0.3 to 4.0 hours.

If desired, the polymerization may be effected in a known manner under supercritical conditions in the first reactor, i.e. in the slurry reactor, like in the loop reactor, and/or as a condensed mode in the gas phase reactors.

In the following the catalyst component is defined in more detail. Preferably the catalyst comprises (i) a complex of formula (I):

(i) a transition metal compound of formula (I)

$$R_n(Cp')_2MX_2 \qquad (I)$$

wherein

"M" is zirconium (Zr) or hafnium (Hf), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), "n" is 1 or 2, preferably 1, and (ii) a cocatalyst comprising a compound of a group 13 metal, e.g. Al or boron compound.

Preferred catalysts and their prepartion are for instance described in WO 2010/052263 A1, EP 2 487 203 as well as in WO2013/007650.

In one preferred embodiment the transition metal compound is selected from the group consisting of: rac-methyl (cyclohexyl)silanediylbis(2-methyl-4-(4-tert-butylphenyl) indenyl)zirconium dichloride, rac-dimethylsilanediyl bis(2-methyl-4-(4-tert-butylphenyl)-1,5,6,7-tetrahydro-s-indacen-1-yl)zirconium dichloride and rac-dimethylsilanediyl bis(2-methyl-4-phenyl-5-methoxy-6-tert-butylindenyl)zirconium dichloride.

In another preferred embodiment the transition metal compound is selected from the tables given below:

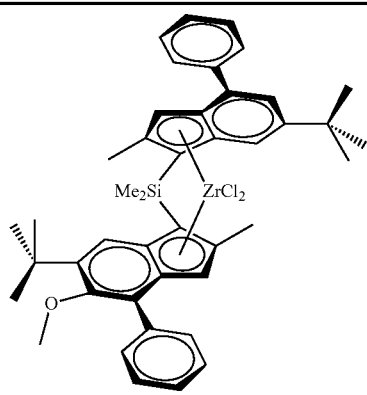

rac-anti-Me$_2$Si(2-
Me-4-Ph-6-tBu-
Ind)(2-Me-4-Ph-5-
OMe-6-tBu-
Ind)ZrCl$_2$

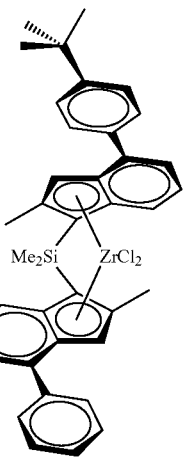

rac-anti-Me$_2$Si(2-
Me-4-(p-tBuPh)-
Ind)(2-Me-4-Ph-5-
OMe-6-tBu-
Ind)ZrCl$_2$

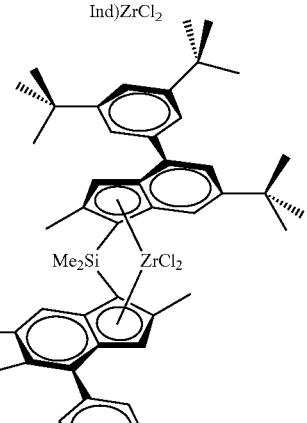

rac-anti-Me$_2$Si(2-Me-
4-(3,5-di-tBuPh)-6-
tBu-Ind)(2-Me-4-Ph-
5-OMe-6-tBu-
Ind)ZrCl$_2$

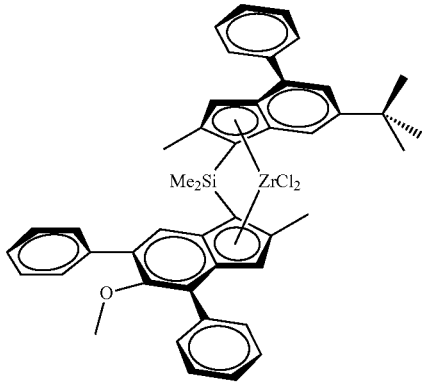

rac-anti-Me$_2$Si(2-
Me-4-Ph-6-tBu-
Ind)(2-Me-4,6-di-
Ph-5-OMe-
Ind)ZrCl$_2$

| 13 | 14 |
|---|---|
| 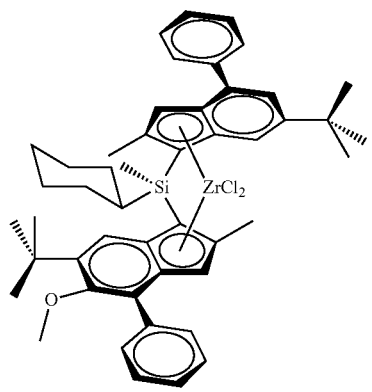<br>rac-anti-Me(CyHex)Si(2-Me-4-Ph-6-tBu-Ind)(2-Me-4-Ph-5-OMe-6-tBu-Ind)ZrCl₂ | 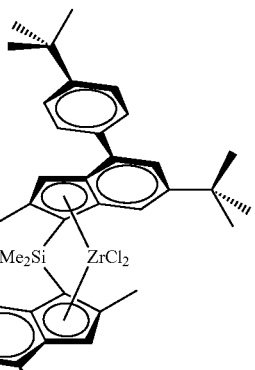<br>rac-anti-Me₂Si(2-Me-4-(p-tBuPh)-6-tBu-Ind)(2-Me-4-Ph-5-OMe-6-tBu-Ind)ZrCl₂ |
| 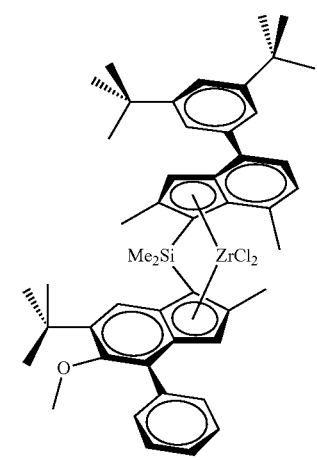<br>rac-anti-Me₂Si(2-Me-4-(3,5-di-tBuPh)-7-Me-Ind)(2-Me-4-Ph-5-OMe-6-tBu-Ind)ZrCl₂ | 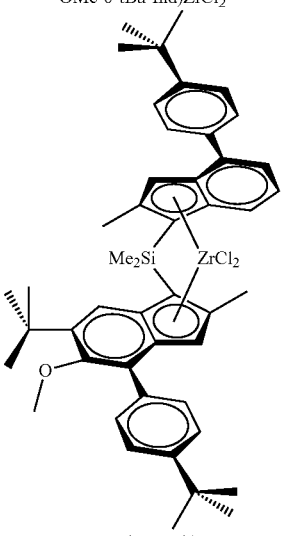<br>rac-anti-Me₂Si(2-Me-4-(p-tBuPh)-Ind)(2-Me-4-(4-tBuPh)-5-OMe-6-tBu-Ind)ZrCl₂ |
| 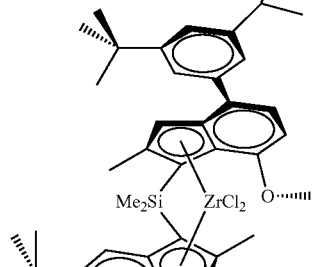<br>rac-anti-Me₂Si(2-Me-4-(3,5-di-tBuPh)-7-OMe-Ind)(2-Me-4-Ph-5-OMe-6-tBu-Ind)ZrCl₂ | 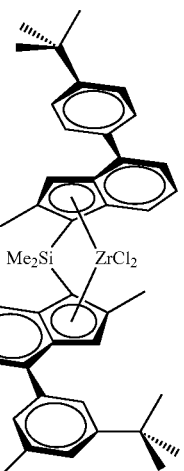<br>rac-anti-Me₂Si(2-Me-4- |

(p-tBuPh)-
Ind)(2-Me-4-
(3,5-tBu2Ph)-5-
OMe-6-tBu-
Ind)ZrCl$_2$

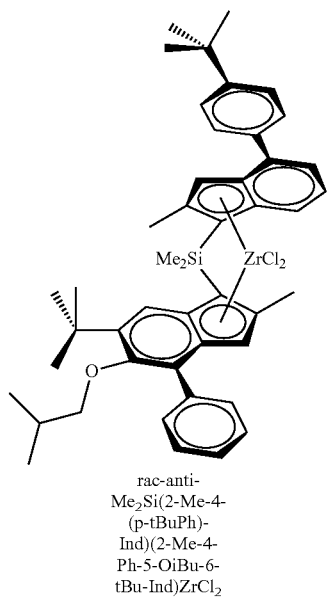

rac-anti-
Me$_2$Si(2-Me-4-
(p-tBuPh)-
Ind)(2-Me-4-
Ph-5-OiBu-6-
tBu-Ind)ZrCl$_2$ Mineral Filler (F)

Any mineral filler can be used in the present invention. However it is preferred that the mineral filler (F) is a phyllosilicate, mica or wollastonite. Even more preferred the mineral filler (F) is selected from the group consisting of mica, wollastonite, kaolinite, smectite, montmorillonite and talc. The most preferred the inorganic filler is talc.

The mineral filler (F) preferably has a median particle size d50 [mass percent] of equal or below 10 µm, more preferably below 5.0 µm, like below 3.0 µm.

The mineral filler (F) preferably has a cutoff particle size d95 [mass percent] of equal or below 20 µm, more preferably below 10.0 µm, like below 8.0 µm.

Typically the mineral filler (F) has a surface area of less than 50 m$^2$/g, more preferably of less than 30 m$^2$/g, yet more preferably of less than 25 m$^2$/g. Mineral fillers (F) fulfilling these requirements are preferably anisotropic mineral fillers, like talc, mica and wollastonite.

High Density Polyethylene (HDPE)

The polypropylene composition according to the present invention may further comprise a high density polyethylene (HDPE). A high density polyethylene (HDPE) in the sense of the present invention has preferably a density of at least 940 kg/m$^3$, more preferably of at least 950 kg/m$^3$, yet more preferably in the range of 940 to 975 kg/m$^3$, still yet more preferably in the range of 950 to 970 kg/m$^3$.

Preferably the high density polyethylene (HDPE) has a melt flow rate MFR$_2$ (190° C.) of 0.2 to 15 g/10 min, more preferably of 0.3 to 10.0 g/10 min.

The Plastomer (P)

In a preferred embodiment, the composition of the present invention further comprises a plastomer (P). That is to say, a plastomer (P) can be present in the inventive polypropylene composition. The plastomer (P) is (chemically) different to the elastomeric propylene copolymer (EC) of the heterophasic propylene copolymer (HECO). More precisely the plastomer (P) is preferably selected from the group consisting of a linear low density polyethylene (LLDPE), a styrenic block copolymer (SBC), and mixtures thereof. In one embodiment the inventive composition comprises as plastomer (P) a linear low density polyethylene (LLDPE), especially a linear low density polyethylene (LLDPE) as defined below.

The linear low density polyethylene (LLDPE) has preferably a density in the range 820 to 920 kg/m$^3$, more preferably in the range of 850 to 900 kg/m$^3$, yet more preferably in the range of 840 to 880 kg/m$^3$, like in the range of 860 to 885 kg/m$^3$.

Preferably the linear low density polyethylene (LLDPE), is featured by a specific melt flow rate, namely by a melt flow rate MFR$_2$ (190° C.) measured according to ISO 1133 in the range of 0.5 to 100.0 g/10 min, preferably in the range of 1.0 to 25.0 g/10 min, like in the range of 1.5 to 12.0 g/10 min.

In a preferred embodiment the linear low density polyethylene (LLDPE), is a copolymer containing as a major part units derivable from ethylene. Accordingly it is appreciated that the linear low density polyethylene (LLDPE) comprises at least 50.0 wt.-% units derivable from ethylene, more preferably at least 55.0 wt.-% of units derived from ethylene. Thus it is appreciated that the linear low density polyethylene (LLDPE) comprises 50.0 to 70.0 wt.-%, more preferably 55.0 to 65 wt.-%, units derivable from ethylene. The comonomers present in the linear low density polyethylene (LLDPE), are C$_4$ to C$_{20}$ α-olefins, like 1-butene, 1-hexene and 1-octene, the latter especially preferred. Accordingly in one specific embodiment the linear low density polyethylene (LLDPE) is an ethylene-1-octene copolymer with the amounts given in this paragraph.

Article

The polypropylene composition of the present invention is preferably used for the production of articles, preferably automotive articles, like molded automotive articles, e.g. automotive injection molded articles. Even more preferred is the use of the inventive polypropylene composition for the production of automotive interiors and exteriors, like bumpers, side trims, step assists, body panels, spoilers, dashboards, interior trims and the like.

According to a preferred embodiment of the present invention, the composition of the present invention is used for the production of automotive articles, preferably interior automotive articles, more preferably dash boards, instrument panels, door claddings, arm rests, gear sticks, shift lever knobs, mats, interior skins, trunk claddings, or interior trims.

The present invention also provides (automotive) articles, like injection molded articles, comprising at least to 60 wt.-%, preferably at least 80 wt.-%, more preferably at least 95 wt.-%, and most preferably consisting of the inventive composition. Accordingly the present invention is especially directed to automotive articles, especially to car interiors and exteriors, like bumpers, side trims, step assists, body panels, spoilers, dashboards, interior trims and the like, comprising at least to 60 wt.-%, preferably at least 80 wt.-%, more preferably at least 95 wt.-%, and most preferably consisting of the inventive polypropylene composition.

According to a preferred embodiment of the present invention, the automotive article is an interior automotive article, more preferably a dash board, instrument panel, door cladding, arm rest, map pocket, column trim, shift lever knob, interior skin, trunk cladding, or interior trim in general.

In the following the present invention is further illustrated by means of examples.

EXAMPLES

1. Measuring Methods

The following definitions of terms and determination methods apply for the above general description of the invention as well as to the below examples unless otherwise defined.

Calculation of comonomer content of the elastomeric propylene copolymer (EC), respectively:

$$\frac{C(HECO) - w(PP) \times C(PP)}{w(EC)} = C(EC) \quad (IV)$$

wherein
w(PP) is the weight fraction [in wt.-%] of the polymer matrix (M), i.e. polymer produced in the first and second reactor (R1+R2),
w(EC) is the weight fraction [in wt.-%] of the elastomeric propylene copolymer (EC), i.e. polymer produced in the third and optionally fourth reactor (R3+R4)
C(PP) is the comonomer content [in mol-%] of thepolymer matirx (M), i.e. comonomer content [in wt.-%] of the polymer produced in the first and second reactor (R1+R2),
C(HECO) is the comonomer content [in wt-%] of the heterophasic propylene copolymer (HECO),
C(EC) is the calculated comonomer content [in wt-%] of elastomeric propylene copolymer (EC), i.e. of the polymer produced in the third and optionally fourth reactor (R3+R4).

Quantification of Microstructure by NMR Spectroscopy

Quantitative nuclear-magnetic resonance (NMR) spectroscopy was used to quantify the comonomer content of the polymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28(5), 475. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6k) transients were acquired per spectra. Quantitative $^{13}C\{^{1}H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

Comonomer content in polyethylene [HDPE, Plastomer (P)] was measured in a known manner based on Fourier transform infrared spectroscopy (FTIR) calibrated with $^{13}C$-NMR, using Nicolet Magna 550 IR spectrometer together with Nicolet Omnic FTIR software. Films having a thickness of about 250 μm were compression molded from the samples. Similar films were made from calibration samples having a known content of the comonomer. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

MFR$_2$ (230° C.) is measured according to ISO 1133 (230° C., 2.16 kg load).

MFR$_2$ (190° C.) was measured according to ISO 1133 (190° C., 2.16 kg load).

The Density was measured according to ISO 1183-1—method A (2004). Sample preparation is done by compression moulding in accordance with ISO 1872-2:2007.

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005-07-01.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C. Crystallization temperature and heat of crystallization ($H_c$)

are determined from the cooling step, while melting temperature and heat of fusion (H$_f$) are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Flexural Modulus: The flexural modulus was determined in 3-point-bending according to ISO 178 on 80×10×4 mm$^3$ test bars injection molded at 23° C. in line with EN ISO 1873-2.

Charpy notched impact strength is determined according to ISO 179 leA at 23°, and at −20° C. by using an 80×10×4 mm$^3$ test bars injection molded in line with EN ISO 1873-2.

Cutoff particle size d50 and 95 (Sedimentation) is calculated from the particle size distribution [mass percent] as determined by gravitational liquid sedimentation according to ISO 13317-3 (Sedigraph).

Surface area: BET with N$_2$ gas according to DIN 66131/2, apparatus Micromeritics Tristar 3000: sample preparation at a temperature of 50° C., 6 hours in vacuum.

Scratch Visibility

To determine the scratch visibility a Cross Hatch Cutter Model 420P, manufactured by Erichsen, was used. For the tests, plaques of 70×70×4 mm size were cut from a moulded grained (grain parameters: average grain size=1 mm, grain depth=0.12 mm, conicity=6°) plaque of size 140×200×4 mm. The period between injection moulding of specimens and scratch-testing was 7 days.

For testing the specimens must be clamped in a suitable apparatus as described above. Scratches were applied at a force of 10 N using a cylindrical metal pen with a ball shaped end (radius=0.5 mm±0.01). A cutting speed of 1000 mm/min was used.

A minimum of 20 scratches parallel to each other were brought up at a load of 10 N with a distance of 2 mm. The application of the scratches was repeated perpendicular to each other, so that the result was a scratching screen. The scratching direction should be unidirectional. The scratch visibility is reported as the difference of the luminance ΔL of the unscratched from the scratched areas. ΔL values were measured using a spectrophotometer that fulfils the requirements to DIN 5033. Light source for quantification of ΔL D65/10°.

A detailed test description of the test method (Erichsen cross hatch cutter method) can be found in the article "Evaluation of scratch resistance in multiphase PP blends" by Thomas Koch and Doris Machl, published in POLYMER TESTING 26 (2007), p. 927-936.

2. Examples

The catalyst Cat1 used in the polymerization processes for the heterophasic propylene copolymer (HECO 1 and HECO 3) was prepared as follows:

The catalyst used has been prepared following the general procedures described in WO2013/007650 to prepare catalyst E2P, using the same metallocene complex (E2 in WO2013/007650) rac-anti-dimethylsilanediyl(2-methyl-4-(4'-tert-butylphenyl)inden-1-yl)(2-methyl-4-phenyl-5-methoxy-6-tert-butylinden-1-yl) zirconium dichloride. Its composition is indicated in table 1 below:

TABLE 1

| Catalyst | Al/Zr in unprepped catalys (molar ratio) | Degree of prepping (g(PP)/g(cat)) |
| --- | --- | --- |
| Cat1 | 300 | 3.5 |
| Cat2 | 440 | 3.5 |

Catalyst Synthesis:

Inside the glovebox, 80.0 μl of dry and degassed surfactant was mixed with 2 mL of MAO in a septum bottle and left to react overnight. The following day, 58.7 mg of the metallocene (0.076 mmol, 1 equivalent) was dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of perfluoro-1.3-dimethylcyclohexane (PFC) at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. under an argon flow. 0.81 g of a red solid catalyst was obtained.

Catalyst off-line prepolymerization (Prepping): The above catalyst was pre-polymerised according to the following procedure: Off-line pre-polymerisation experiment was done in a 125 mL pressure reactor equipped with gas-feeding lines and an overhead stirrer. Dry and degassed PFC (15 cm$^3$) and 801.7 mg of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The propylene feed was left open and the monomer consumption was compensated by keeping the total pressure in the reactor constant (about 5 barg). The experiment was continued until a polymerisation time (17 min.) sufficient to provide the desired degree of polymerisation (DP=3.5). The reaction was stopped by flashing the volatile components. Inside the glove box, the reactor was opened and the content poured into a glass vessel. The PFC was evaporated until a constant weight was obtained to yield 3.59 g of the pre-polymerised catalyst.

The catalyst Cat2 used in the polymerization processes for the heterophasic propylene copolymer (HECO2) is described in example 10 of WO 2010/052263 A1 and its composition is also reported in Table 1.

Polymerization Procedure:

Step 1: Bulk Homopolymerization.

A stirred autoclave, equipped with a double helix stirrer, with a volume of 21.2 dm$^3$ containing 0.2 bar-g propylene was filled with additional 3.97 kg propylene. After adding 0.73 mmol triethylaluminium (Aldrich, 1 molar solution in n-hexane) using a stream of 250 g propylene, the solution was stirred at 20° C. and 250 rpm for 20 min, then the reactor was brought up to the set prepolymerization temperature and the catalyst was injected as described in the following. The solid, pre-polymerized catalyst (type, amount and degree of polymerisation as listed in table 2) was loaded into a 5-mL stainless steel vial inside the glovebox, the vial was attached to the autoclave, then a second 5-mL vial containing 4 ml n-hexane and pressurized with 10 bars of N2 was added on top, the valve between the two vials was opened and the solid catalyst was contacted with hexane under N2 pressure for 2 s, then flushed into the reactor with 250 g propylene. Stirring speed was increased to 250 rpm and pre-polymerisation was run for the set time. At the end of the prepolymerization step the stirring speed was increased to 350 rpm and the temperature raised to 80° C. When the internal reactor temperature reached 71° C., the desired H2 amount was added with a defined flow rate via thermal mass flow controller. The reactor temperature was held constant throughout the polymerization. The polymerization time was measured starting when the inner reactor temperature reached 2° C. below the set polymerization temperature.

Step 2: First Gas Phase Homopolymerisation (GP1)

After the bulk step was completed, the stirrer speed was reduced to 50 rpm and the reactor pressure was reduced to 1 bar below the target gas phase pressure by venting the monomer. Afterwards the stirrer speed was set to 250 rpm, the reactor temperature to 80° C., and additional H2 was added via flow controller. When the reactor pressure reached the target pressure and T=79° C., both P and T have been held constant via mass flow controller and thermostat at a set pressure and at 80° C. for a defined time (max 2 hours) or until the propylene amount required to reach the desired split had been fed.

Step 3: Second Gas Phase Step, C2/C3 Copolymerization (GP2)

After the first gas phase step (GP1) was completed, the stirrer speed was reduced to 50 rpm, the reactor pressure was lowered to 0.3 bar by venting propylene and the temperature control device was set to 70° C. The reactor was then filled with 200 g propylene at a flow of 70 g/min, and then the reactor was vented again down to 0.3 barg, with the purpose of minimizing the amount of hydrogen left in the reactor.

Then the stirrer speed was set to 250 rpm and the thermostat at the target value and the reactor was filled with a mixture of propylene and ethylene in a defined C3/C2 ratio (transition between GP1 and GP2). This ratio depends on the measured relative reactivity ratio (R) of ethylene and propylene for the given catalyst. The speed of the reactor filling during the transition was limited by the max. flow of the gas flow controllers. When the reactor temperature had reached 1° C. below the target temperature (70° C.) and the pressure was at the desired value, the composition of the fed C3/C2 mixture was changed to the desired polymer composition, and the temperature and pressure parameters was held constant until a defined amount of C3 and C2 was consumed to reach the target split of rubber to homopolymer. The reaction was stopped by lowering the stirrer speed to 20 rpm, cooling the reactor to 30° C. and flashing the volatile components.

After purging the reactor twice with $N_2$ and one vacuum/$N_2$ cycle, the product was taken out and dried overnight in a hood and additionally 2 hours in a vacuum drying oven at 60° C. After weighing, the polymer was additivated with 0.2 wt.-% Ionol and 0.1 wt.-% PEPQ.

The results are listed in table 2.

TABLE 2

| | | Polymerization conditions | | |
|---|---|---|---|---|
| | | HECO 1 091 | HECO 2 079 | HECO 3 090 |
| catalyst | [type] | Cat1 | Cat2 | Cat1 |
| | [mg] | 203 | 350 | 189 |
| Loop | | | | |
| Temperature | [° C.] | 80 | 80 | 80 |
| time | min | 20 | 30 | 20 |
| Split | [%] | 38 | 45 | 41 |
| H2 | NL | 3.5 | 1.8 | 3.5 |
| GPR 1 | | | | |
| Temperature | [° C.] | 80 | 80 | 80 |
| Pressure | bar-g | 34 | 30 | 25 |
| time | min | 20.5 | 44 | 47.8 |
| H2 | NL | 1.1 | 0.32 | 1.1 |
| C3 fed | g | 510 | 700 | 414 |
| Split | [%] | 32 | 27 | 30 |
| GPR 2 | | | | |
| Temperature | [° C.] | 70 | 70 | 70 |
| Pressure | bar-g | 20 | 20 | 20 |
| time | min | 87 | 130 | 171 |
| Split | [%] | 31 | 28 | 29 |
| C2/C3[1] | [g/g] | 12.67 | 7.57 | 0.82 |
| C2/C3[2] | [g/g] | 3.96 | 2.90 | 0.25 |

[1]ratio during transition
[2]ratio during polymerization at constant T, P

TABLE 3

| | | Properties | | | |
|---|---|---|---|---|---|
| | | HECO 1 091 | HECO 2 079 | HECO 3 090 | HECO 4 EF015AE |
| $MFR_2$ (Matrix) | [g/10 min] | 35 | 35 | 35 | 85 |
| $MFR_2$ (total) | [g/10 min] | 2.8 | 14.0 | 19.6 | 18 |
| Tm | [° C.] | 149 | 150 | 148 | 164 |
| Tc | [° C.] | 110 | 112 | 113 | 112 |
| Tg(1) of M | [° C.] | 1.6 | 2.8 | 0.7 | 2.0 |
| Tg(2) of E | [° C.] | −35.4 | −46.5 | −41.4 | −54.1 |
| C2 total | [wt-%] | 33.3 | 22.0 | 7.4 | 20 |
| XCS | [wt.-%] | 29.2 | 27.1 | 27.7 | 29 |
| IV of XCS | [dl/g] | 3.5 | 1.2 | 1.8 | 2.8 |
| C2 of XCS | [mol-%] | 79.3 | 74.4 | 21.6 | 69 |
| 2,1 in whole polymer | [%] | 0.9 | nm | nm | 0 |
| 2,1 in XCS fraction | [%] | nm | 0 | nm | 0 | nm not measured

The polypropylene compositions were prepared by melt blending the components on a co-rotating twin screw extruder type Coperion ZSK 40 (screw diameter 40 mm, L/D ratio 38) at temperatures in the range of 170–190° C., using a high intensity mixing screw configuration with two sets of kneading blocks.

TABLE 4

| Compositions | | IE1 | IE2 | IE3 | CE1 | CE2 | IE4 |
|---|---|---|---|---|---|---|---|
| HECO1 | [wt.-%] | — | — | 60 | — | — | — |
| HECO2 | [wt.-%] | 60 | — | — | — | — | 80 |
| HECO3 | [wt.-%] | — | 60 | — | — | — | — |
| HECO 4 | [wt.-%] | — | — | — | 60 | — | — |
| H-P | [wt.-%] | — | — | — | — | 40 | — |
| HDPE | [wt.-%] | 10 | 10 | 10 | 10 | 10 | — |
| Plastomer | [wt.-%] | 10 | 10 | 10 | 10 | 30 | — |
| Talc | [wt.-%] | 20 | 20 | 20 | 20 | 20 | 20 |
| Total MFR | [g/10 min] | 11 | 15 | 2 | 14 | 20 | 10 |
| Flex. Modulus | [MPa] | 1315 | 1152 | 1312 | 1308 | 1032 | 1671 |
| NIS @23° C. | [kJ/m$^2$] | 44 | 70 | 78 | 58 | 70 | 8.7 |
| NIS @–20° C. | [kJ/m$^2$] | 4.6 | 6.2 | 9.1 | 7.1 | 8.6 | 2.5 |
| Scratch ΔL/10N | [—] | 1.8 | 2.7 | 2.0 | 3.3 | 3.5 | 2.6 |

H-P is a propylene homopolymer having an MFR$_2$ (230° C.) of 30 g/10 min

HDPE is the commercial high density polyethylene (HDPE) "MG9641" of Borealis AG having a melt flow rate MFR$_2$ (190° C.) of 8 g/10 min and a density of 964 kg/m$^3$.

Talc is the commercial product "HM2" of IMI-Fabi (Italy) having a median particle size d50 of 2.4 μm, a cutoff particle size d95 of 7.7 μm and a specific surface of 21 m$^2$/g.

Plastomer is the commercial product Engage 8200 of Dow Elastomers which is an ethylene-octene copolymer having an MFR$_2$ (190° C.) of 5.0 g/10 min a density of 870 kg/m$^3$, and 1-octene content as determined by FTIR calibrated with $^{13}$C-NMR of 38 wt %.

The invention claimed is:

1. A polypropylene composition comprising
   (a) a heterophasic propylene copolymer (HECO) comprising
      (a1) a matrix (M) being a propylene homopolymer (H-PP) or propylene copolymer (R-PP) and
      (a2) an elastomeric propylene copolymer (EC) dispersed in said matrix (M),
   (b) a mineral filler (F),
   (c) a high density polyethylene (HDPE), having
      (c1) a density of at least 940 kg/m$^3$ and
      (c2) a melt flow rate MFR$_2$ (190° C.) of 0.2 to 10 g/10 min, and
   (d) a plastomer (P) being chemically different to the elastomeric propylene copolymer (EC) of the heterophasic propylene copolymer (HECO), wherein the plastomer (P):
      (d1) is a polyethylene,
      (d2) has a density in the range 820 to 880 kg/m$^3$, and
      (d3) has a melt flow rate MFR$_2$ (190° C.) measured according to ISO 1133 in the range of 0.5 to 30.0 g/10 min,
   wherein said heterophasic propylene copolymer (HECO) has
      (i) a melting temperature determined by differential scanning calorimetry (DSC) in the range of 140 to 155° C.,
      (ii) an ethylene content in the range of 22.0 to 35.0 wt %, based on the total weight of the heterophasic propylene copolymer (HECO),
      (iii) a xylene cold soluble (XCS) content in the range of 20 to 35 wt.-%, and
      (iv) a comonomer content of the xylene cold soluble (XCS) fraction in the range of 60 to 95 wt.-%,
   wherein further the weight ratio between the heterophasic propylene copolymer (HECO) and the mineral filler (F) [(HECO)/(F)] is in the range of 2/1 to below 4/1 and the melt flow rate MFR$_2$ (230° C.) measured according to ISO1133 of the polypropylene composition is in the range of 1.0 to 11.0 g/10min.

2. The polypropylene composition according to claim 1, wherein
   (a) the matrix (M) has melt flow rate MFR$_2$ (230° C.) measured according to ISO 1133 in the range of 20 to 80 g/10 min, and/or
   (b) the heterophasic propylene copolymer (HECO) has 2,1 regio-defects of at least 0.2 mol % determined by $^{13}$C-NMR spectroscopy.

3. A polypropylene composition comprising
   (a) a heterophasic propylene copolymer (HECO) comprising
      (a1) a matrix (M) being a propylene homopolymer (H-PP) or propylene copolymer (R-PP) and
      (a2) an elastomeric propylene copolymer (EC) dispersed in said matrix (M),
   and
   (b) a mineral filler (F),
   (c) a high density polyethylene (HDPE), having
      (c1) a density of at least 940 kg/m$^3$ and
      (c2) a melt flow rate MFR$_2$ (190° C.) of 0.2 to 10 g/10 min, and
   (d) a plastomer (P) being chemically different to the elastomeric propylene copolymer (EC) of the heterophasic propylene copolymer (HECO), wherein the plastomer (P):
      (d1) is a polyethylene,
      (d2) has a density in the range 820 to 880 kg/m$^3$, and
      (d3) has a melt flow rate MFR$_2$ (190° C.) measured according to ISO 1133 in the range of 0.5 to 30.0 g/10 min,
   wherein said heterophasic propylene copolymer (HECO) has
      (i) 2,1 regio-defects of at least 0.2 mol % determined by $^{13}$C-NMR spectroscopy,
      (ii) an ethylene content in the range of 22.0 to 35.0 wt %, based on the total weight of the heterophasic propylene copolymer (HECO),
      (iii) a xylene cold soluble (XCS) content in the range of 20 to 35 wt.-%, and
      (iv) a comonomer content of the xylene cold soluble (XCS) fraction in the range of 60 to 95 wt.-%,
   wherein further the weight ratio between the heterophasic propylene copolymer (HECO) and the mineral filler (F) [(HECO)/(F)] is in the range of 2/1 to below 4/1, and the melt flow rate MFR$_2$ (230° C.) measured according to ISO1133 of the polypropylene composition is in the range of 1.0 to 11.0 g/10 min.

4. The polypropylene composition according to claim 3, wherein the matrix (M) has melt flow rate MFR$_2$ (230° C.) measured according to ISO 1133 in the range of 20 to 80 g/10 min.

5. The polypropylene composition according to claim 1, wherein
   (a) the matrix (M) is a propylene homopolymer (H-PP), and/or
   (b) the intrinsic viscosity of the xylene cold soluble fraction (XCS) of the heterophasic propylene copolymer (HECO) is at least 1.0.

6. The polypropylene composition according to claim 1, wherein the melt flow rate $MFR_2$ (230° C.) measured according to ISO 1133
   of the heterophasic propylene copolymer (HECO) is in the range of 1.0 to 30 g/10 min.

7. The polypropylene composition according to claim 1, wherein the heterophasic propylene copolymer (HECO) has a first glass transition temperature Tg(1) and a second glass transition temperature Tg(2), wherein said first glass transition temperature Tg(1) is above the second glass transition temperature Tg(2).

8. An article comprising a composition according to claim 1.

9. The article according to claim 8, wherein the article is an automotive interior article.

10. The polypropylene composition according to claim 3, wherein
   (a) the matrix (M) is a propylene homopolymer (H-PP), and/or
   (b) the intrinsic viscosity of the xylene cold soluble fraction (XCS) of the heterophasic propylene copolymer (HECO) is at least 1.0.

11. The polypropylene composition according to claim 3, wherein the melt flow rate $MFR_2$ (230° C.) measured according to ISO 1133
   of the heterophasic propylene copolymer (HECO) is in the range of 1.0 to 30 g/10 min.

12. The polypropylene composition according to claim 3, wherein the heterophasic propylene copolymer (HECO) has a first glass transition temperature Tg(1) and a second glass transition temperature Tg(2), wherein said first glass transition temperature Tg(1) is above the second glass transition temperature Tg(2).

* * * * *